(12) United States Patent
Walker

(10) Patent No.: US 8,528,171 B2
(45) Date of Patent: Sep. 10, 2013

(54) APPARATUS FOR STORING AND ORGANIZING ELECTRICAL CORDS

(75) Inventor: Elionne LaMar Walker, Houston, TX (US)

(73) Assignee: Elionne LaMar Walker, Houston, TX (US)

( * ) Notice: Subject to any disclaimer, the term of this patent is extended or adjusted under 35 U.S.C. 154(b) by 404 days.

(21) Appl. No.: 12/363,288

(22) Filed: Jan. 30, 2009

(65) Prior Publication Data

US 2010/0192330 A1 Aug. 5, 2010

(51) Int. Cl.
*F16G 11/02* (2006.01)

(52) U.S. Cl.
USPC ..... 24/115 R; 24/129 D; 24/129 R; 24/115 A

(58) Field of Classification Search
USPC ............... 24/130, 127, 129 D, 115 R, 129 B, 24/30.5 S, 115 A, 712.1, 712.5, 129 R
See application file for complete search history.

(56) References Cited

U.S. PATENT DOCUMENTS

| | | | | |
|---|---|---|---|---|
| 3,068,316 A | * | 12/1962 | Witt | 174/135 |
| 4,267,995 A | * | 5/1981 | McMillan | 248/74.1 |
| 4,600,112 A | * | 7/1986 | Shillington et al. | 215/274 |
| 4,644,610 A | * | 2/1987 | Fish | 24/30.5 S |
| 4,979,614 A | * | 12/1990 | Ruhaut | 206/702 |
| D374,174 S | * | 10/1996 | McClellan | D9/711 |
| 6,161,263 A | * | 12/2000 | Anderson | 24/545 |
| 6,301,752 B1 | * | 10/2001 | Koppang | 24/129 R |
| 6,425,165 B2 | * | 7/2002 | Koppang | 24/129 R |
| 6,656,514 B1 | * | 12/2003 | Tubbs | 426/115 |
| 7,214,092 B1 | * | 5/2007 | Platt | 439/501 |
| 7,318,567 B2 | * | 1/2008 | Mori et al. | 248/51 |
| 7,766,168 B2 | * | 8/2010 | Thrapp et al. | 206/496 |
| 2008/0256759 A1 | * | 10/2008 | Kasbohm | 24/30.5 S |
| 2011/0146012 A1 | * | 6/2011 | Hirst | 15/104.93 |

* cited by examiner

*Primary Examiner* — Robert J Sandy
*Assistant Examiner* — Michael Lee

(57) ABSTRACT

A storage device for electrical cords which provides an easy and secure method to contain the cords' length into a small bundle for economy of space and travel is described. By folding the length of cord over itself and inserting the cord into and through an open end of the flexible, semi-rigid hollow cylinder, it is grasped and held by a plurality of inwardly projecting flexible teeth, formed by multiple slits made perpendicular to the interior wall, at the opposite end of the device. In another embodiment, the storage device has the same characteristics but also has an interior wall of prehensile material that further secures the cord in place. Cords can be removed from the device as quickly as they were inserted. Various sizes of the same design are suitable for short and small diameter personal appliance cords, as well as for large industrial electrical cords.

12 Claims, 2 Drawing Sheets

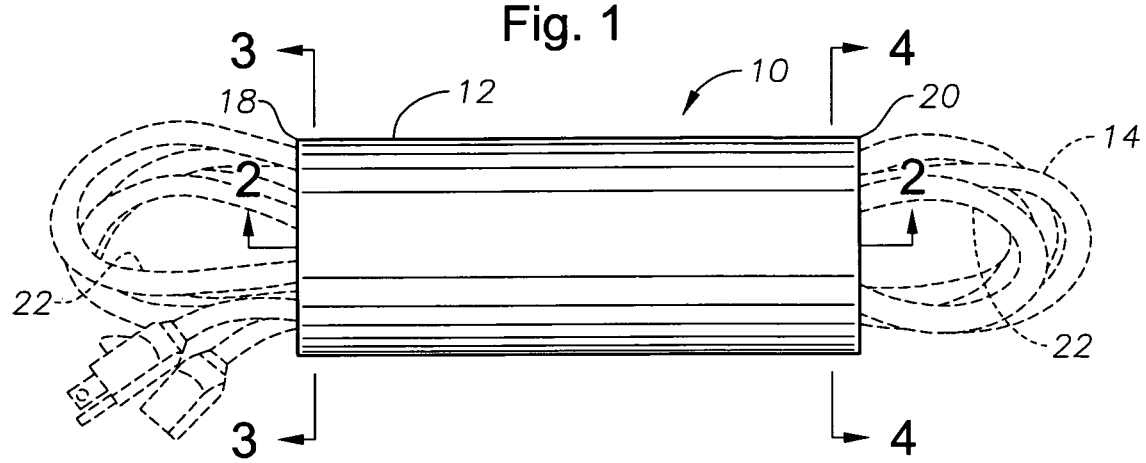
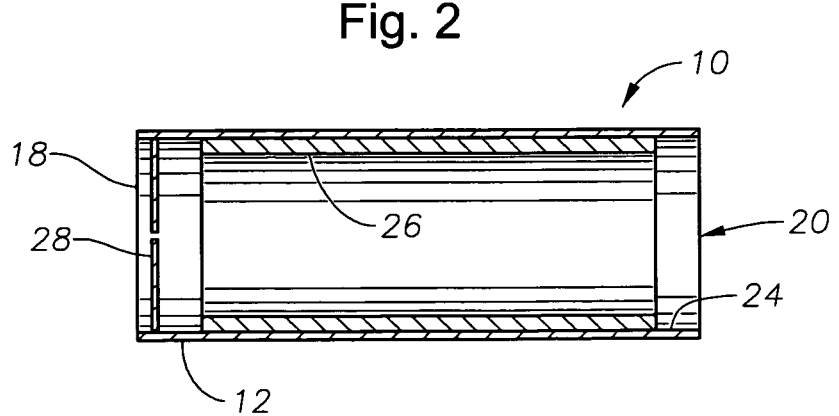

APPARATUS FOR STORING AND ORGANIZING ELECTRICAL CORDS

BACKGROUND

Electrical devices requiring power cords are prevalent in all aspects of today's home and workplace. Some of these electrical devices are equipped with permanent electrical cords while others are equipped with detachable electrical cords that can be removed and stored when not in use.

In many cases, these electrical devices are equipped with power cords of a length greater than is necessary. Such excess cord is unsightly, particularly if there are numerous cords adjacent one another that can become tangled together. Moreover, such excess cord can pose a tripping hazard. Further, such excess cord may be attractive for small children to play with or for pets to chew.

With respect to detachable electrical cords, cords stored together have a tendency to become tangled and it is difficult to identify the various cords being stored.

Yet another situation posing a cord containment problem is the storage of seasonal items such as room fans, space heaters and electrical blankets. When one stores these items in close proximity to each other, the likelihood that one or more of these heavy items will be placed on top of the cord for a prolonged period of time is increased, possibly resulting in damage to the cord.

It would be a benefit, therefore, to have a device for storing the excess length of an electrical power cord that may be used to adjust the length of the power cord to the minimum length required to provide electrical power to an appliance.

SUMMARY

A cord storage device includes an elongated tube having a first open end and a second open end and an interior wall. Disposed in one of the ends are a plurality of inwardly projecting teeth, tabs or fingers. It should be noted that in one preferred embodiment, the forgoing tabs are only located in either the first end or the second end, but preferably not both. Disposed on at least a portion of the interior wall is a webbing or tactile material. In another embodiment of the invention, the tabs or fingers project inward at a point along the length of the interior wall.

In one embodiment of the invention, the teeth are formed by providing a disk, wall or endcap in an open end of the tube, which disk is provided with radial slots extending out from the axis of the elongated tube, thereby forming said teeth. Preferably, said endcap or disk is formed of a rigid or semi-rigid material, such as rubber or plastic. The inwardly projecting teeth, tabs or fingers are of sufficient rigidity that they grasp a bundled cord inserted therethrough and support the weight of the tube on the cord, but of sufficient flexibility so as to partially deflect when a cord is inserted or withdrawn through the teeth.

In use, a cord may be "bundled" up by folding it over on itself, thereby creating loops of cord of a desired length and then inserting the bundled cord into either end of the open tube. The "teeth" will engage the various gaps and openings in the loops of cord so as to hold the elongated tube in place on the cord, thereby containing the cord. The web or tactile material on the inner wall of the tube may further assist in "gripping" the cord so as to prevent the cord from slipping out of the tube.

BRIEF DESCRIPTION OF THE DRAWINGS

FIG. 1 is a side elevation view of one preferred embodiment of the cord organizer according to the present invention with an electrical power cord shown in phantom lines.

FIG. 2 is a cross sectional view of the cord organizer shown in FIG. 1, taken along the line 2-2 of FIG. 1.

DETAILED DESCRIPTION OF PREFERRED EMBODIMENTS

Figure 3A:
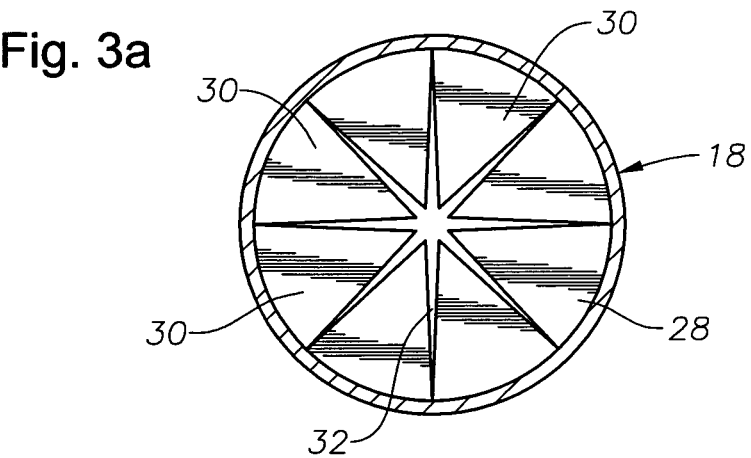
FIG. 3 is an elevation view of a first end of the cord organizer according to the present invention.

Referring to FIG. 1, a preferred embodiment of a cord organizer 10 according to the present invention is shown as an elongated body member 12 configured for receiving a folded cord 14, which in the illustration of FIG. 1 is a standard electrical power cord that is not in use (i.e., both ends of the cord are unplugged), in an axial passageway 16, which is shown in cross section in FIG. 2. Body member 12 has a first end 18 and a second end 20. Cord 14, when folded as shown, forms a plurality of loops as at 22 which protrude from the ends 18, 20 of body member 12 when cord organizer 10 is disposed around cord 14.

Referring to FIG. 2, body member 12 is seen as an elongate tubular body with axial passageway 16 formed longitudinally through the body. Body member 12 is characterized by an interior wall 24 extending between first end 18 and second end 20. In one preferred embodiment, the interior diameter of elongated body member 12 is substantially the same along axial passageway 16 between first end 18 and second end 20. In one preferred embodiment, the interior of passageway 16 is configured to facilitate storing and organizing electrical cords and other kinds of wiring when they are folded in the well-known manner illustrated by cord 14 in FIG. 1. When a cord is folded over itself in this accordion-like manner the folded bundle naturally takes on the shape of a figure eight—the outer ends of the bundle are thicker where the cord folds back on itself and the center of the bundle is relatively thinner. That is, a circumference around the bundle of cord is relatively greater near the outer opposite ends of the bundle than a circumference around the bundle near the middle. To partially secure cord organizer 10 in place on the bundled cord 14, at least a portion of interior wall 24 may be provided with a web or tactile material 26. In one embodiment, the web material is a cross-hatched material as is commonly used to provide cushioning for the transport of glass bottles. The webbing forms diamond shapes between individual strands of the cross-hatching. When formed in the shape of a cylinder with a particular diameter, the described web material is known to have the capability of expanding outward to a larger diameter when an object is inserted therein. In one preferred embodiment, however, the web material lines a portion of the interior wall and as such, does not have such capability as used in the embodiment of the invention. Rather, it is the tactile nature of the material that tends to "grip" a cord inserted as shown in FIG. 1. In this regard, other tactile material 26 may be used, such as for example, soft rubber. The tactile material 26 may be disposed as strips or an inner sleeve of material disposed around the inner circumference of the wall. Preferably said tactile material is of a relatively thin thickness and the sleeve formed by said material has substantially the same diameter along its length as affixed to the interior wall 24 of elongated body 12.

In another embodiment of the invention, web material 26 is formed into a cylinder as described above, said web material cylinder having a diameter smaller than the interior diameter of elongated body member 12. In this embodiment, the opposing open ends of the cylinder formed by the web material 26 may be slightly expanded and secured adjacent the open ends 18, 20 of elongated body member 12. Thus, web material 26 can constrict along a substantial length of the elongated body member 12 around a cord 14 inserted therein.

With reference to FIGS. 2 and 3, disposed in one of the ends 18, 20 of elongated body member 12 is a wall or endcap 28 perpendicular to the axis of passageway 16. A plurality of inwardly projecting teeth, tabs or fingers 30 are formed in wall 28. Teeth 30 are preferably formed by providing radial extending cuts or slots 32 in wall 28. While teeth 30 may take any shape so long as they perform the function as described herein, for ease of manufacture, teeth 30 are triangular in shape.

Figure 3B:
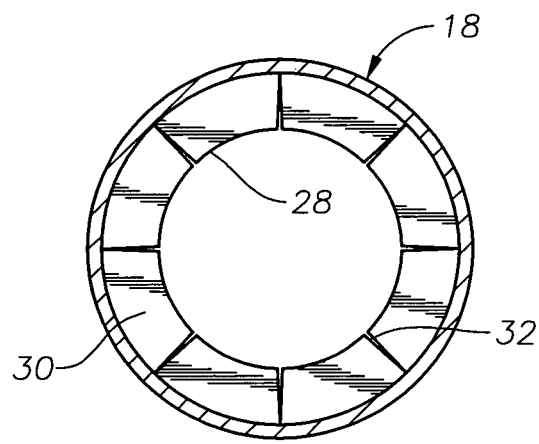

As shown in FIG. 3*b*, in another embodiment of the invention, wall 28 extends only partially toward the axis of body 12. In this embodiment of the invention, wall 28 may or may not be provided with teeth 30 defined by slots 32.

Figure 4:
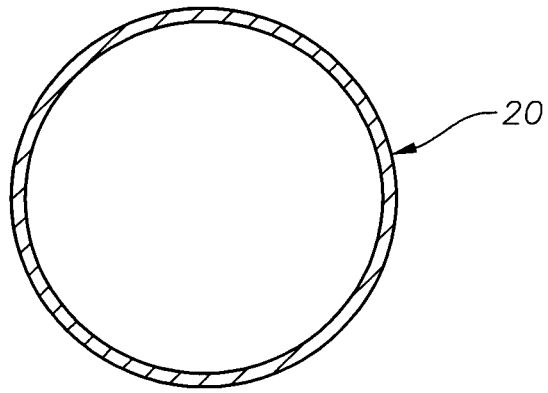
FIG. 4 is an elevation view of the second end of the cord organizer according to the present invention.

It should be noted that in one preferred embodiment, the forgoing wall 28 forming teeth 30 is only located in either the first end or the second end, but preferably not both (see FIG. 4, where an open end of elongated tubular body 12 is shown without a wall). In another embodiment of the invention, wall 28 may be positioned at a point along the length of the interior wall 24. However, it has been found to be most desirable to position wall 28 at one of the ends of elongated body member 12. In this regard, it is most desirable to utilize only a single wall 28. Utilizing two or more walls 28 as described herein complicates insertion and extraction of cord 14.

Preferably, wall 24 is formed of a rigid or semi-rigid material, such as rubber or plastic or heavy cardboard. The inwardly projecting teeth 30 are of sufficient rigidity that they grasp a bundled cord inserted therethrough and support the weight of the tube on the cord, but of sufficient flexibility so as to partially deflect when a cord is inserted or withdrawn through the teeth. Specifically, the teeth 30 protrude into the loops or openings 22 formed by cord 14 so as to engage cord 14, thereby preventing cord 14 from sliding out of cord organizer 10.

Elongated body 12 is tubular, preferably cylindrical in shape. The tube length preferably ranges between 3 inches and 6 inches. The diameter of the tube is preferably no larger than 4 inches and no smaller than 1.5 inches. In this regard, a tube having an outer diameter of approximately 2 inches and a length of approximately 5 is particularly desirable. The size is selected to permit ready usage with standard 16 and 18 gauge appliance cord of a length of approximately 6 feet. Notably, if body 12 is too long, a cord 14 cannot be bundled and protrude from both ends of body 12 as contemplated by the invention. As such, teeth 30 could not "engage" the loops 22 of cord 14 as taught herein. Likewise, if body 12 is too short, the teeth 30 would not engage loops 22. Thus, in one embodiment of the invention, the aforementioned length is one of the inventive elements. Likewise, the diameter is selected so that the container 10 of the invention can function with standard size electrical cords. Of course, these dimensions are optimal dimensions based on a standard electrical cord that accompanies most appliances and consumer electrical devices. Those skilled in the art will appreciate that cords of different gauges and different lengths may require other dimensions.

The elongated tube 12 is formed of a material of sufficient rigidity so as not to substantially deform when a bundled cord is inserted therein. Thus, the tube would not substantially deform from its tubular shape under the normal application of pressure by grasping. In this regard, the tube is not formed of readily deformable "soft" rubber, but to the extent the tube is formed of rubber, it is formed of a "hard" rubber as described below. Other non-limiting examples of materials for use in forming tube 12 include polymer, PVC or cardboard. Notably, cardboard is desirable because it is readily and quickly biodegradable.

In any event, as contemplated by the invention, "hard" rubber as described herein is a plastic, resinous material mixed with a polymerizing or curing agent and fillers, and can be formed under heat and pressure to create the described tubular shape. The bulk of today's hard rubber is made with SBR synthetic rubber. Other types of synthetic rubbers, such as butyl or nitrite or, in rare cases, silicone or polyacrylic, can also be used. Once it has gone through the process of heat and pressure, hard rubber cannot be returned to its original state and therefore falls into the class of thermosetting plastics, i.e., those that undergo chemical change under heat and pressure. It differs, however, from other commercial thermosetting plastics such as the phenolics and the ureas in that after it has gone through the thermosetting process it will still soften somewhat under heat. In this characteristic it most resembles the thermoplastic acetates, polystyrenes, and vinyls. It differs from all others in that it is available in pliable sheet form before vulcanization and is therefore adaptable to many shapes for which molds and presses are not necessary. Because of this feature and because it can be softened again after vulcanization, it falls into a class by itself in the field of plastics. The hardness of hard rubber is measured on the Shore D scale, which is several orders of magnitude higher than the Shore A scale used for conventional rubbers and elastomers. Similar in composition to soft rubber, it contains a much higher percentage of sulfur, up to a saturation point of 47% of the weight of the rubber in the compound. If sulfur is present in rubber compounds in amounts over 18% of the weight of rubber in the compound when the material is completely vulcanized, the product will be generally known as hard rubber.

In accordance with the foregoing, "hard" rubber may be characterized as follows:

| | Property | | |
|---|---|---|---|
| Material | Ultimate tensile stress S/MPa | Density D · cc/g | densile speed sqrt(S/D) · s/m |
| Hard Rubber | 39 | 1.13 to 1.18 | 181 to 186 |

The most important properties of hard rubber are the combination of relatively high tensile strength, low elongation, and extremely low water absorption.

As stated above, while preferred dimensions are set forth herein for a standard cord, cord organizer 10 may be manufactured in any size to accommodate any particular cord or wiring. For a relatively large electrical cord such as a typical extension cord the length of body member 12 will be relatively longer than the length of a body member designed for use with a smaller electrical cord.

The cord holder of the present invention may be used with cords that are in use with appliances and electronic equipment such as computers and fax machines, where the length of the cord exceeds the amount needed to stretch from the electrical outlet to the appliance. The holder may just as well be used to organize telephone cords that are longer than needed in a particular setting. Similarly, the organizer may be used to keep unused cords neatly organized and stored without tangling, for example, temporary use cords such as those attached to small appliances, hair dryers, curling irons and the like. While the present invention has been described in terms of a preferred embodiment and various alternates, it will be appreciated by one of ordinary skill that the spirit and scope of the invention is not limited to those embodiments, but extend to the various modifications and equivalents as defined in the appended claims.

What is claimed is:

1. A holder for a bundle of electrical cord folded over on itself to form opposing loops therein, said holder comprising:
    an elongated body member having a longitudinal passageway formed therethrough and defined around a main axis, the passageway having opposite ends and includes an interior diameter substantially constant along the length of the passageway;
    a wall perpendicular to said main axis, said wall defined in only a single end of the elongated body, said wall includes a plurality of radially extending slots therein, said slots defining a plurality of teeth extending inwardly from said elongated body member toward said main axis; and
    a tactile material disposed along at least a portion of the length of an interior wall of the elongated body member and forming a sleeve of a web material comprising a multiplicity of cross-hatched strands arranged relative to one another so as to form diamond shaped apertures between said strands, wherein the tactile material is for providing a grip to the bundle of electrical cord to be held within the elongated body member.

2. The holder of claim 1, wherein the interior wall has a constant cross-section along the length of said passageway.

3. The holder of claim 1, wherein said tactile material is rubber.

4. The holder of claim 1, wherein said elongated body is cylindrical in shape and is characterized by an outer diameter of no more than 2 inches.

5. The holder of claim 1, wherein said elongated body is no more than 4.5 inches in length along the main axis.

6. The holder of claim 1, wherein said elongated body is semi-rigid.

7. The holder of claim 1, wherein said elongated body is formed of hard rubber.

8. The holder of claim 1, wherein said elongated body is formed of cardboard.

9. The holder of claim 1, wherein said elongated body is formed of plastic.

10. The holder of claim 1, wherein said strands are formed of rubber.

11. The holder of claim 1, wherein said teeth are adjacent to one another and spaced around the inner periphery of said tubular member.

12. The holder of claim 1, wherein said elongated body is characterized by an outer diameter of approximately 2 inches and a length of approximately 4.5-5 inches in length along the main axis.

* * * * *